(12) United States Patent
Liu (10) Patent No.: US 12,421,080 B2
(45) Date of Patent: Sep. 23, 2025

(54) METHOD AND APPARATUS FOR NON-CONTACT AND EYE-MOVEMENT INPUT OF ELEVATOR FLOOR

(71) Applicant: Minjiang University, Fujian (CN)

(72) Inventor: Tianjian Liu, Fuzhou (CN)

( * ) Notice: Subject to any disclaimer, the term of this patent is extended or adjusted under 35 U.S.C. 154(b) by 1136 days.

(21) Appl. No.: 17/348,498

(22) Filed: Jun. 15, 2021

(65) Prior Publication Data

US 2021/0395039 A1  Dec. 23, 2021

(30) Foreign Application Priority Data

Jun. 18, 2020 (CN) .......................... 202010559861.9

(51) Int. Cl.
*B66B 1/46* (2006.01)
*G06F 3/01* (2006.01)
*G06V 40/16* (2022.01)

(52) U.S. Cl.
CPC .............. *B66B 1/468* (2013.01); *G06F 3/013* (2013.01); *G06V 40/161* (2022.01); *B66B 2201/4623* (2013.01); *B66B 2201/4638* (2013.01)

(58) Field of Classification Search
CPC ............ B66B 1/468; B66B 2201/4623; B66B 2201/4638; G06V 40/161; G06F 3/013
USPC ......................................................... 187/380
See application file for complete search history.

(56) References Cited

U.S. PATENT DOCUMENTS

| | | | |
|---|---|---|---|
| 10,732,721 B1* | 8/2020 | Clements | B66B 1/468 |
| 10,802,582 B1* | 10/2020 | Clements | G06F 3/013 |
| 11,907,421 B1* | 2/2024 | Clements | G06F 3/012 |
| 2001/0031072 A1* | 10/2001 | Dobashi | G06V 40/161 |
| | | | 382/118 |
| 2002/0191819 A1* | 12/2002 | Hashimoto | G06V 40/10 |
| | | | 382/118 |
| 2009/0051787 A1* | 2/2009 | Yoon | H04N 23/61 |
| | | | 382/118 |
| 2019/0076016 A1* | 3/2019 | Samadani | A61B 3/0033 |
| 2021/0395039 A1* | 12/2021 | Liu | G06V 40/161 |
| 2023/0071037 A1* | 3/2023 | Kim | G06F 3/04886 |

FOREIGN PATENT DOCUMENTS

| | | | | |
|---|---|---|---|---|
| CN | 109230927 A | * | 1/2019 | ........... B66B 1/3423 |
| CN | 109684969 A | * | 4/2019 | ............. G06N 3/045 |
| CN | 110325467 A | * | 10/2019 | ............... B66B 1/14 |
| CN | 117842804 A | * | 4/2024 | ........... B66B 5/0037 |
| JP | 2010100370 A | * | 5/2010 | |
| JP | 2011190070 A | * | 9/2011 | |

\* cited by examiner

*Primary Examiner* — Christina M Schreiber (57) ABSTRACT

The present disclosure discloses systems, methods and an apparatus for non-contact and eye-movement input of an elevator floor, which comprises: selecting a target camera according to a distance sensor installed on a button panel inside the elevator; triggering a corresponding target camera by using the distance sensor for face detection; standardizing a detected human face and locating a binocular position; inputting data of a standardized human face image and a binocular image into a preset posture discriminator to obtain a predicted head posture and an eyeball posture; according to the head posture and the eyeball posture, calculating a line-of-sight direction and a coordinate of an attention point, detecting whether a dwell time of the line-of-sight is greater than a preset time threshold, and, if so, triggering a button at the coordinate of the attention point.

10 Claims, 8 Drawing Sheets

METHOD AND APPARATUS FOR NON-CONTACT AND EYE-MOVEMENT INPUT OF ELEVATOR FLOOR

CROSS REFERENCE TO RELATED APPLICATION(S)

This patent application claims the benefit and priority of Chinese Patent Application No.202010559861.9, filed on Jun. 18, 2020, the disclosure of which is incorporated by reference herein in its entirety as part of the present application.

TECHNICAL FIELD

Embodiments of the present disclosure relate to the technical field of artificial intelligence, in particular to systems, methods, and apparatus for non-contact and eye-movement input for selection of an elevator floor, as well as a storage medium readable executable by electronic devices and computers.

BACKGROUND ART

Elevators have long utilized buttons to allow users to select a destination floor. However, it can be very troublesome for a person carrying heavy objects, or who is standing behind others in a crowded elevator, to press the buttons. In addition, autumn and winter are at the height of influenza, and viruses spread rampantly, which makes the elevator buttons very susceptible to transmission. Therefore, it has become the focus of research by technicians in this field to find "non-contact" elevator controls.

SUMMARY

Therefore, embodiments of the present disclosure provide systems, methods, and apparatus for non-contact and eye-movement input of elevator floors in order to solve the problem of having to control elevator buttons via physical contact.

In order to achieve the above purpose, embodiments in the present disclosure provide the following technical scheme:

In a first aspect, the embodiment of the present disclosure provides a method for non-contact and eye-movement input of the elevator floor, which includes: selecting a target camera according to a distance sensor installed on a button panel inside the elevator; triggering a corresponding target camera by using the distance sensor for face detection; standardizing a detected human face and locating a binocular position; inputting data of a standardized human face image and a binocular image into a preset posture discriminator to obtain a predicted head posture and an eyeball posture; according to the head posture and the eyeball posture, calculating a line-of-sight direction and a coordinate of an attention point, detecting whether a dwell time of the line-of-sight is greater than a preset time threshold, and, if so, triggering a button at the coordinate of the attention point.

Further, the method for non-contact and eye-movement input of the elevator floor also includes: training and adjusting parameters of the generative adversarial network to obtain a target generative adversarial network; wherein, the generative adversarial network consists of a plurality of generators and gesture discriminators; and obtaining the gesture discriminator from the target generative adversarial network.

Further, the training and parameter adjustment of the generative adversarial network to obtain the target generative adversarial network includes: aligning an optical axis of the camera pre-installed on the elevator button panel with a center position of both eyes of a test object, and obtaining an image sample data set about the head posture and eyeball posture when the test object's line of sight corresponds to respective buttons in turn; wherein the image sample data set includes a first set of data and a second set of data; locating positions of the human face and eyes in the image sample data set to obtain data items of each image; randomly acquiring corresponding data items to input into the initial generative adversarial network for adversarial training, and, in the adversarial training process, using a weighted sum of the acquired loss resistance data Ladv, reconstruction loss data Lrec, perception loss data Lp and regression loss data Lreg to adjust the network weight coefficient and obtain the target generative adversarial network.

Further, the first set of data includes: when the test object's head keeps still with eyeballs moving, the image data is obtained which is collected when the line of sight corresponds to respective buttons in turn; the second set of data includes: the test object's line of sight is pointed at the buttons, and the head deflects upward, downward, left and right at two angles in each direction, so as to obtain the image data collected when the line of sight corresponds to respective buttons in turn.

Further, the distance sensor includes at least one of: an optical distance sensor, an infrared distance sensor and an ultrasonic distance sensor.

Further, locating positions of the human face and eyes in the image sample data set to obtain data items of each image includes: locating the positions of the human face and eyes in the image sample data set to obtain data items $\{F, \alpha h, \gamma h, El, Er, \alpha e, \gamma e\}$ of each image; wherein F is a human face image, $\alpha h$ is a pitch angle of head motion, $\gamma h$ is a yaw angle of head motion, El is a left eye image, Er is a right eye image, $\alpha e$ is a pitch angle of eye movement, and $\gamma e$ is a yaw angle of eye movement;

Randomly acquiring corresponding data items to input into the initial generative adversarial network for adversarial training, and, in the adversarial training process, using a weighted sum of the acquired loss resistance data Ladv, reconstruction loss data Lrec, perception loss data Lp and regression loss data Lreg to adjust the network weight coefficient and obtain the target generative adversarial network, comprising:

Randomly selecting two sets of data in the image sample data set, wherein a face image F2 and a head posture $[\alpha h1, \gamma h1]$ are input to a generator Gh, and binocular images El2 and Er2 and an eyeball posture $[\alpha e1, \gamma e1]$ are input to a generator Ge, so as to obtain a face composite image Fc1 with a composite posture $[\alpha h1, \gamma h1]$ and binocular composite images Elc1 and Erc1 with a composite posture $[\alpha e1, \gamma e1]$;

Inputting the face composite image Fc1 and the head posture $[\alpha h2, \gamma h2]$ to the generator Gh, and inputting the binocular composite images Elc1 and Erc1 and the eyeball posture $[\alpha e2, \gamma e2]$ to the generator Ge, so as to obtain a reconstructed face image Fr2 and reconstructed binocular images Elr2 and Erc2 meeting preset conditions; comparing and analyzing the reconstructed face image Fr2 and the reconstructed binocular images Elr2 and Erc2 with the face image F2 and the binocular images El2 and Er2 to obtain a reconstructed loss data Lrec;

Inputting the face composite image Fc1 and the binocular composite images Elc1 and Erc1 to the generator Gt to obtain a composite image FEc1 compositing a head posture [αe1, γe1] and an eye posture [αe1, γe1]; inputting the real face image F1, the real binocular images El1 and Er1 and the composite image FEc1 respectively to a preset evaluator for evaluation and analysis to obtain perception loss data Lp;

Inputting the face composite image Fc1 and the real face image F1 respectively to a first posture discriminator Dh to obtain true and false face information and a regression value [αh1, γh1] of the head posture; inputting the binocular composite images Elc1, Erc1 and the real binocular images El1, Er1 to a third posture discriminator De to obtain true and false binocular information that meets default conditions and a regression value [αe1, γe1] of eye postures; acquiring the regression loss data Lreg according to the regression values [αh1, γh1] and [αe1, γe1];

Inputting the true and false face information and the true and false binocular information in cascaded to a second posture discriminator Dt to obtain true or false information which is analyzed to obtain the loss resistance data Ladv;

In the adversarial training process, using a weighted sum of the loss resistance data Ladv, the reconstruction loss data Lrec, the perception loss data Lp and the regression loss data Lreg to adjust the network weight coefficient of the generative adversarial network and obtain the target generative adversarial network.

Further, the method for non-contact and eye-movement input of elevator floor also includes: setting an elevator button panel according to preset rules in advance, installing at least two combinations of cameras and distance sensors at different heights on the elevator button panel; and selecting one of the distance sensors on the button panel according to a preset priority order when a human body is detected getting close to the elevator button panel.

In a second aspect, an embodiment of the present disclosure provides an apparatus of non-contact and eye-movement input of the elevator floor, which includes: a camera selection unit used for selecting a target camera according to a distance sensor installed on a button panel inside the elevator; a face detection unit used for triggering a corresponding target camera by using the distance sensor for face detection; a locating unit used for standardizing a detected human face and locating a binocular position; a posture predicting unit used for inputting data of a standardized human face image and a binocular image into a preset posture discriminator to obtain a predicted head posture and an eyeball posture; an elevator button determination unit used for, according to the head posture and the eyeball posture, calculating a line-of-sight direction and a coordinate of an attention point, detecting whether a dwell time of the line-of-sight is greater than a preset time threshold, and, if so, triggering a button at the coordinate of the attention point.

In a third aspect, embodiments of the present disclosure also provide an electronic device, including: a processor and a memory; wherein the memory is used for storing a program of the method for non-contact and eye-movement input of elevator floor, and after the electronic device is powered on and the processor runs the program of the method for non-contact and eye-movement input of elevator floor, the electronic device performs the method for non-contact and eye-movement input of elevator floor described in any one of the aspects mentioned above.

In a fourth aspect, embodiments of the present disclosure also provide a computer-readable storage medium, wherein the computer storage medium contains one or more program instructions, and the one or more program instructions are used by the processor to perform the method for non-contact and eye-movement input of elevator floor described in any one of the aspects mentioned above.

By adopting the method for non-contact and eye-movement input of the elevator floor disclosed in the present disclosure, intelligent and automatic control of the elevator can be enabled so as to facilitate the operation and avoid manually contacting elevator buttons, thereby effectively preventing infectious virus from spreading through button contact and improving the user experience.

BRIEF DESCRIPTION OF THE DRAWINGS

In order to illustrate the implementations of the present disclosure more clearly, the accompanying drawings will be briefly introduced below. The drawings in the following description are illustrative, and those of ordinary skills in the art may derive other implementation drawings according to these drawings provided herein without undue experimentation.

DETAILED DESCRIPTION OF THE EMBODIMENTS

Implementations of the present disclosure will be illustrated through specific embodiments below. Those skilled in the art can easily understand other advantages and effects of the present disclosure from the contents disclosed in this specification. Obviously, the described embodiments are part of, but not all of, the embodiments of the present disclosure. Based on the embodiments of the present disclosure, all other embodiments obtained by those of ordinary skills in the art without creative work belong to the scope claimed by the present disclosure.

Figure 1:
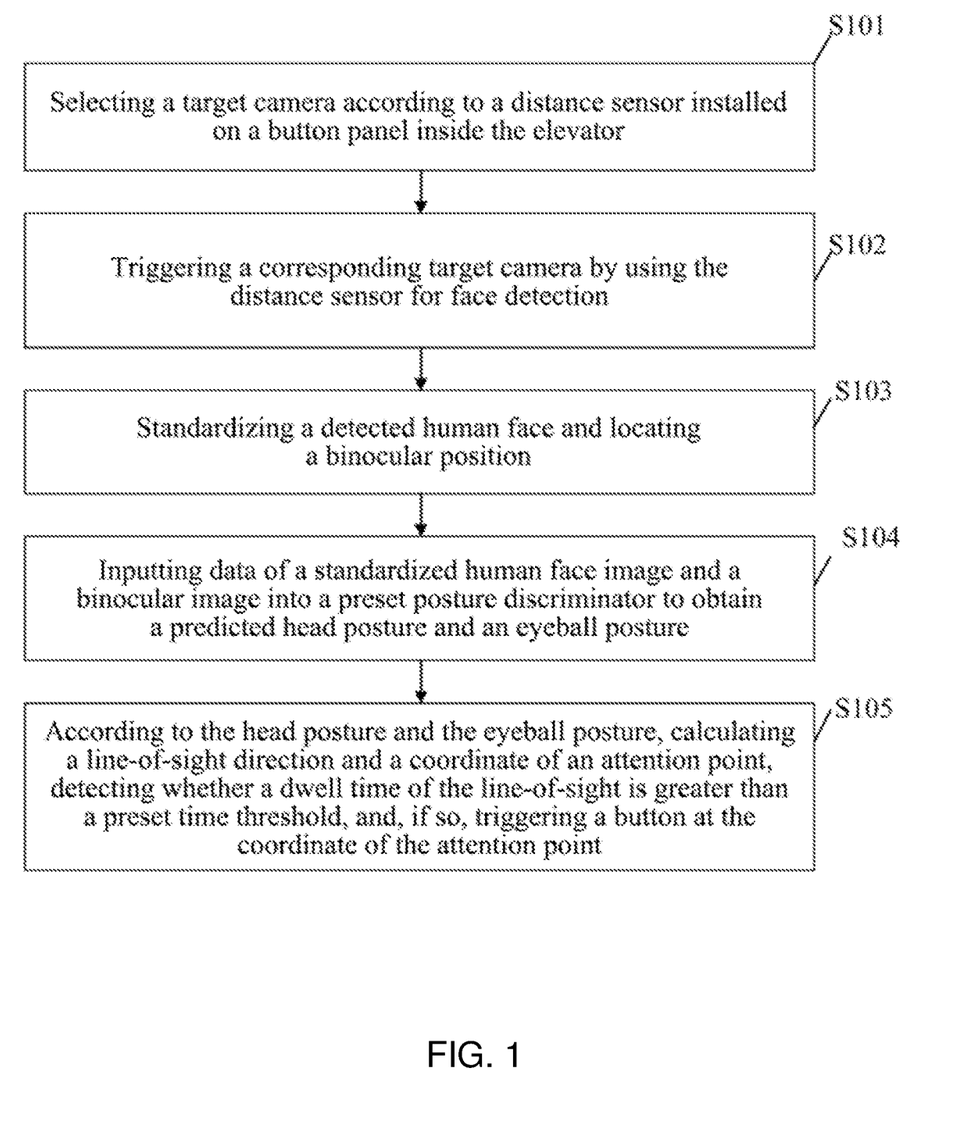
FIG. 1 is a flowchart of a method for non-contact and eye-movement input of elevator floor provided in embodiments of the present disclosure.

According to the method for non-contact and eye-movement input of elevator floor described in the present disclosure, the embodiments of the present disclosure will be described in detail below. As shown in FIGS. 1-4, FIG. 1 is a flowchart of a method for non-contact and eye-movement input of elevator floor provided in embodiments of the present disclosure, the implementation of which includes:

Step 101: Selecting a target camera according to a distance sensor installed on a button panel inside the elevator.

Figure 4:
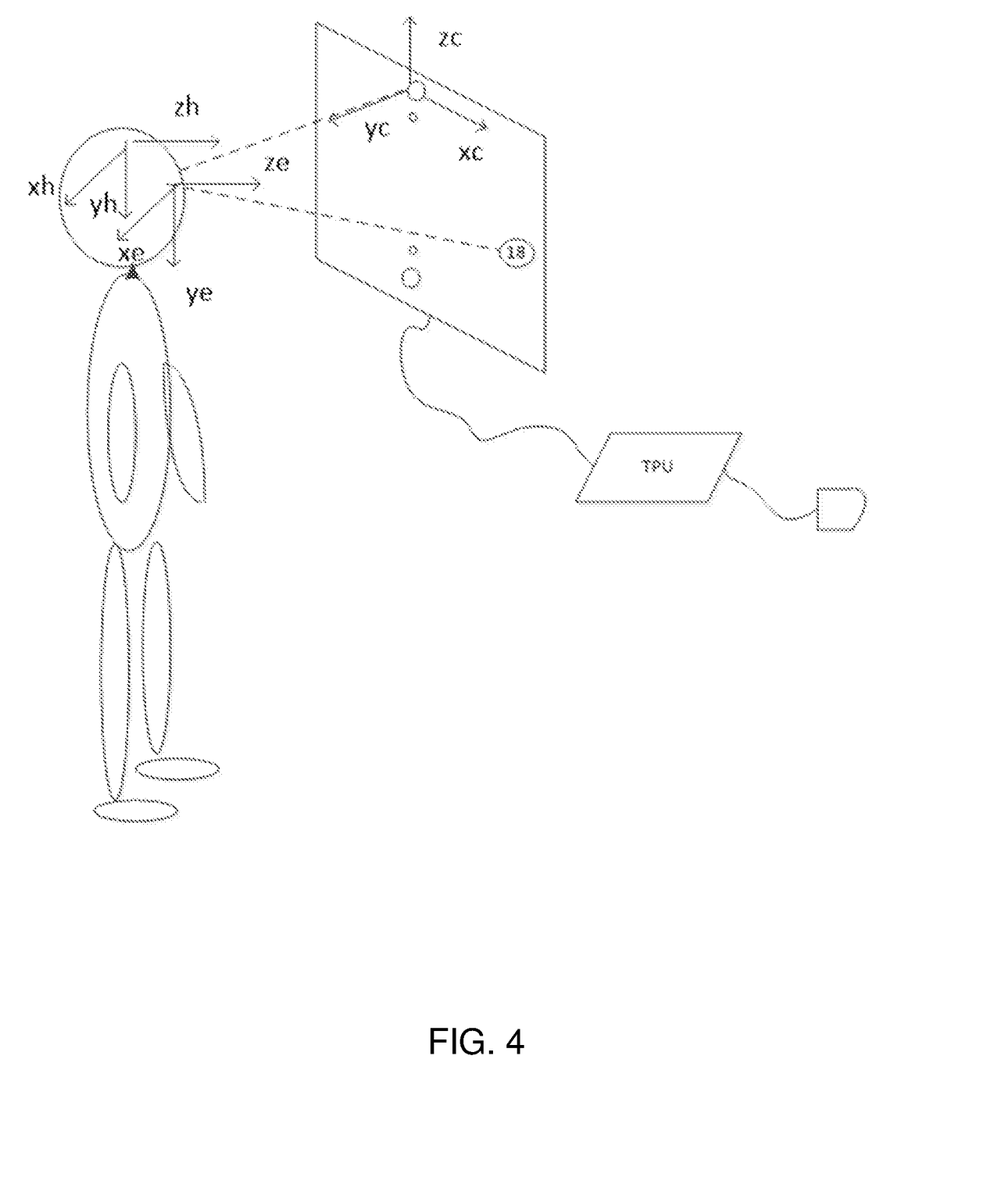
FIG. 4 is a schematic diagram of a test object and an elevator button panel in the method for non-contact and eye-movement input of elevator floor provided in embodiments of the present disclosure.
Figure 5:
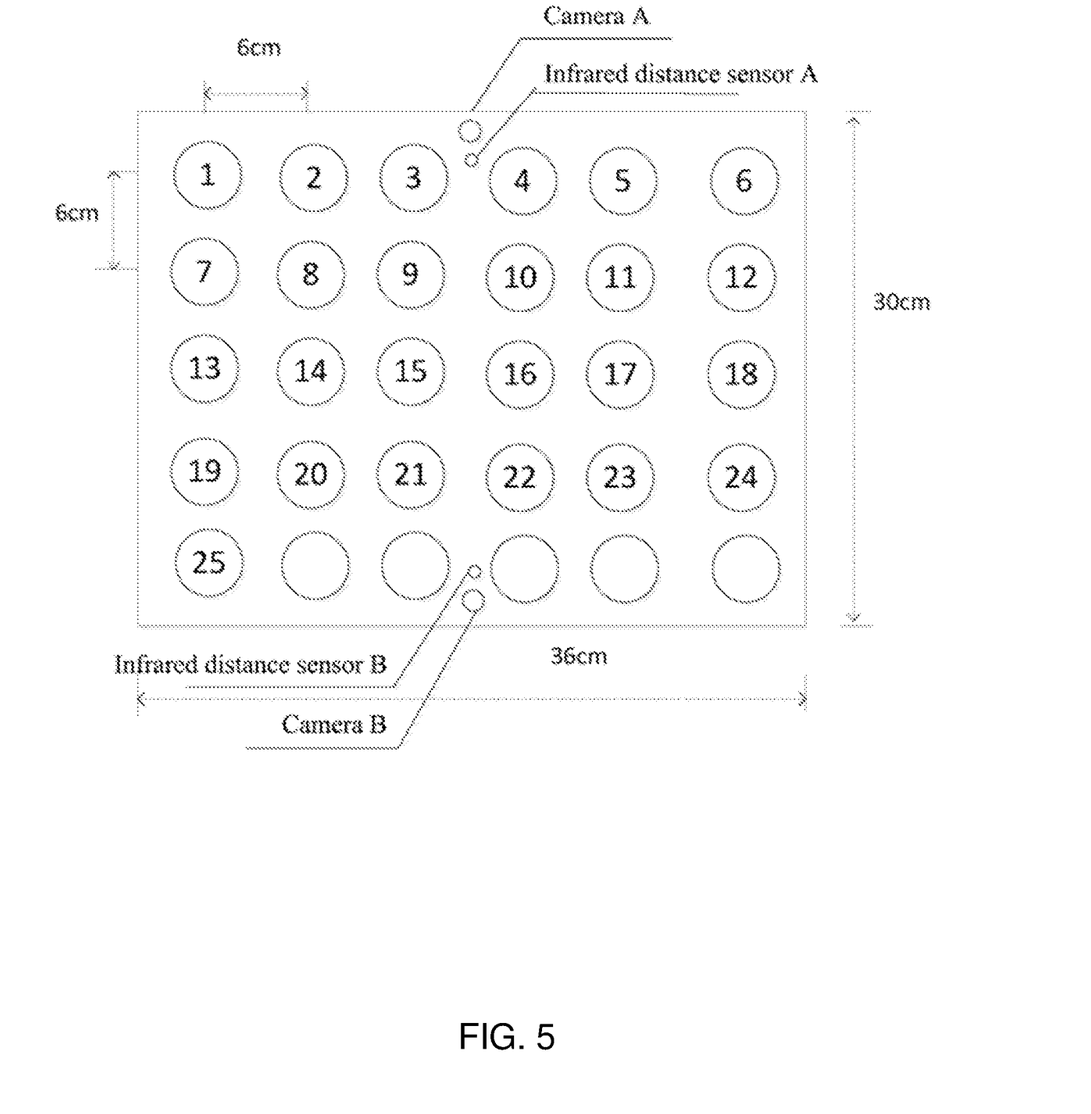
FIG. 5 is a schematic diagram of an elevator button panel in the method for non-contact and eye-movement input of elevator floor provided in embodiments of the present disclosure.

In embodiments of the present disclosure, an elevator button panel can be set in advance according to rules so as to keep a certain distance between the buttons, which may be designed as shown in FIG. 5. To meet the needs of people at different heights, at least two combinations of cameras and distance sensors can be installed at different heights on the button panel of the elevator, for example, cameras and infrared distance sensors are installed on the upper and lower sides of the button panel. One of the distance sensors on the button panel is selected according to a preset priority order when a human body is detected getting close to the button panel of the elevator, and a corresponding target camera is determined according to the selected distance sensor. The distance sensor may be either an infrared distance sensor, or at least one of an optical distance sensor, an ultrasonic distance sensor, and other sensors, without specific limitation herein. As shown in FIG. 4, 18 represents the direction of the user's line of sight when looking at the panel buttons. Tensor Processing Unit (TPU) is a tensor processing unit.

Step 102: Triggering a corresponding target camera by using the distance sensor for face detection.

After a target camera is selected according to a distance sensor installed on the button panel in Step 101, the target camera may be further triggered to perform face detection in this step.

Step 103: Standardizing a detected human face and locating a binocular position

After the human face detection in Step 102, the detected human face may be standardized and the binocular position may be located in this step.

In embodiments of the present disclosure, a standardized image is the image that is acquired by aligning the optical axis of the camera with the binocular center and then converted into an image (e.g., sized by 224*224 pixels), which is convenient for subsequent processing.

Figure 7:
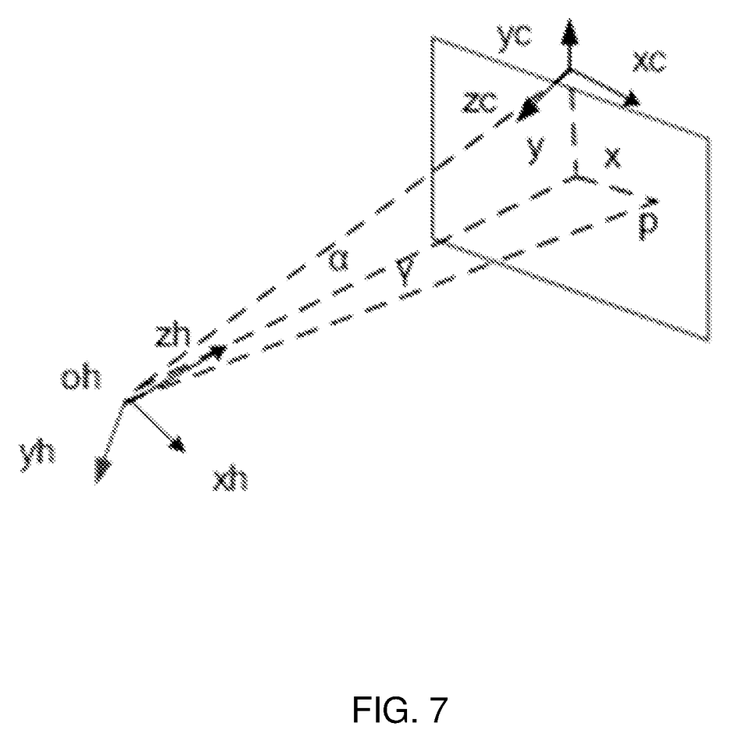
FIG. 7 is a schematic diagram of standardization process in the method for non-contact and eye-movement input of elevator floor provided in embodiments of the present disclosure.
Figure 8:
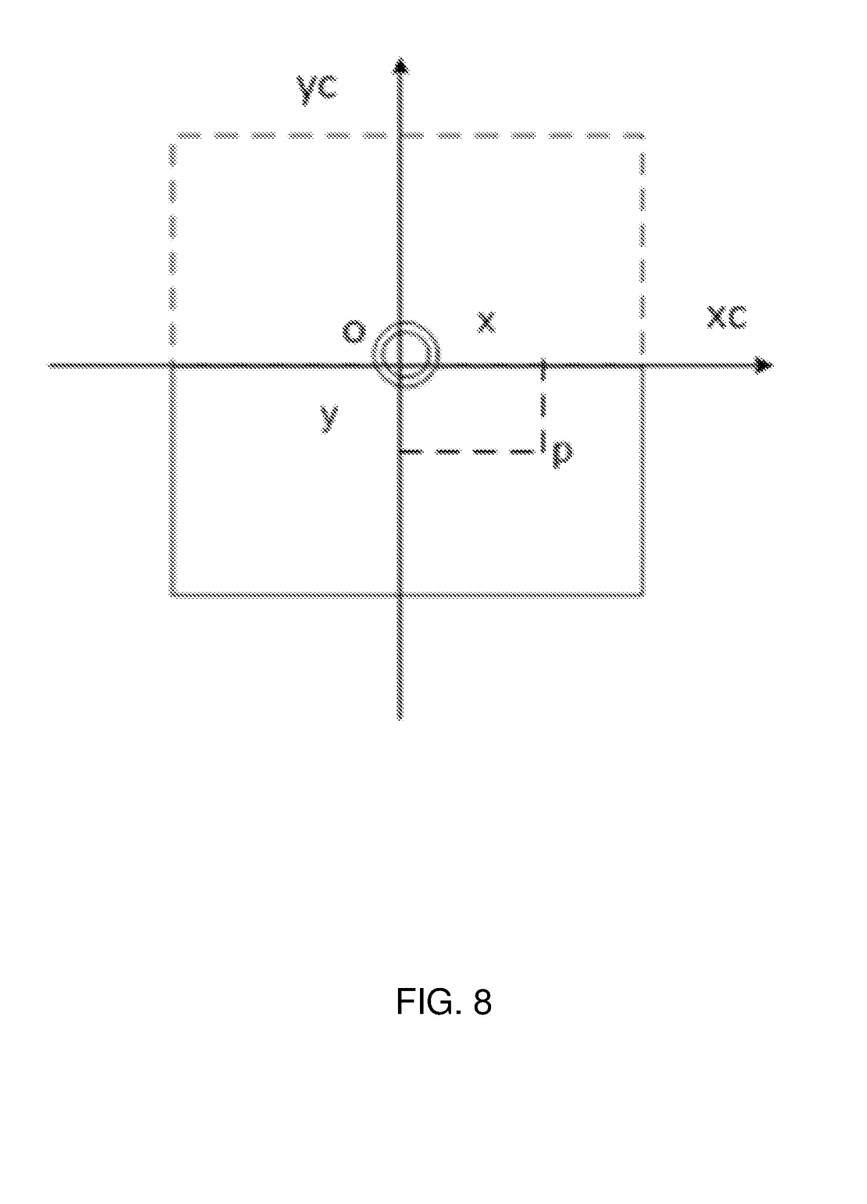
FIG. 8 is a schematic diagram of a plane coordinate system with the camera acting as the coordinate origin in the method for non-contact and eye-movement input of elevator floor provided in embodiments of the present disclosure.

As shown in FIGS. 7 and 8, the button coordinate (x, y) in the rectangular plane coordinate system centered at the camera and the distance d between the binocular center and the camera center are measured so as to obtain a line-of-sight direction at a pitch angle $\alpha=\tan(y/d)$ and a yaw angle $\gamma=\tan(x/d)$, so that the binocular position is located.

Step 104: Inputting data of a standardized human face image and a binocular image into a preset posture discriminator to obtain a predicted head posture and an eyeball posture.

After the detected human face is standardized and the binocular position is located in Step 103, data may be input into a preset posture discriminator in this step to predict a current head posture and an eyeball posture.

In the process of line-of-sight tracking, postures of the human head and eyeballs are restricted by two degrees of freedom (DOF), and the posture features can be measured by the pitch angle $\alpha$ and the yaw angle $\gamma$. The pitch angle $\alpha$ is a backward movement from the neck, generally ranging from −60.4 to 69.6 degrees of sagittal buckling and extension, and the yaw angle $\gamma$ is a left rotation of the head, generally ranging from −79.8 to 75.3 degrees of horizontal axial rotation.

In embodiments of the present disclosure, in order to predict the head posture and the eyeball posture of an elevator rider, the posture discriminator is used in advance. In one implementation, a target generative adversarial network may be obtained by training the generative adversarial network and adjusting parameters thereof, wherein, the posture discriminator is obtained from the target generative adversarial network after training. The generative adversarial network consists of a plurality of generators and gesture discriminators.

Figure 6:
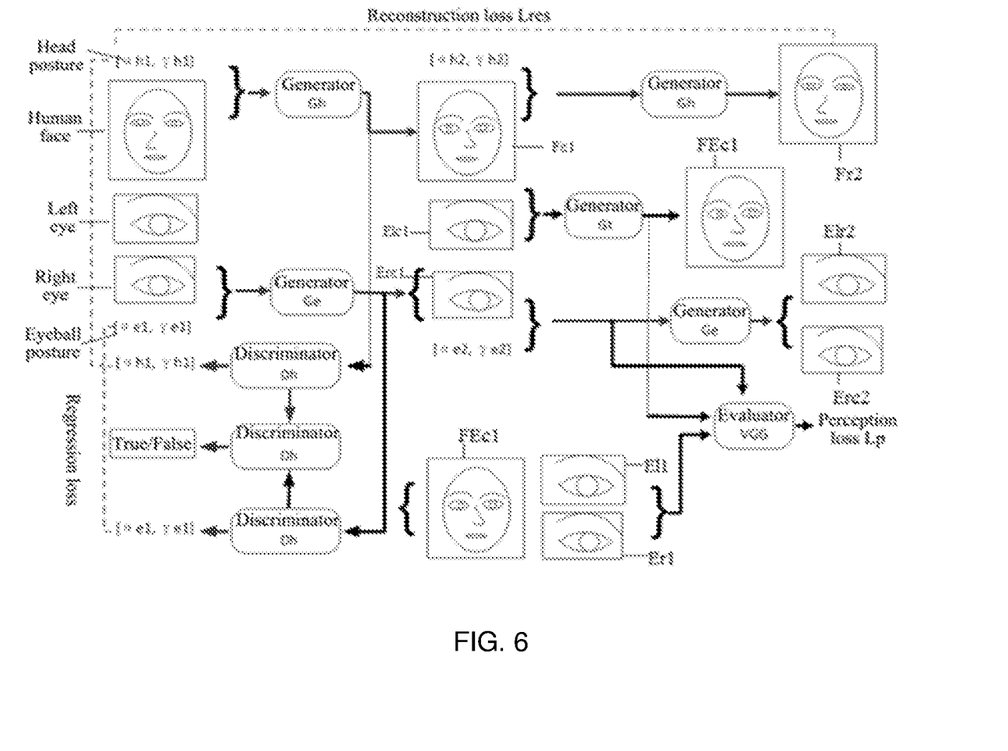
FIG. 6 is a schematic diagram of training a generative adversarial network in the method for non-contact and eye-movement input of elevator floor provided in embodiments of the present disclosure.

FIG. 6 is a schematic diagram of training a generative adversarial network that is part of the method for non-contact and eye-movement input of elevator floor provided in embodiments of the present disclosure. The generative adversarial network can at least consist of a generator Gh, a generator Ge, a posture discriminator De, a posture discriminator Dt, a posture discriminator Dh and an evaluator VGG19.

The training process includes: installing a camera over the elevator button panel, aligning an optical axis of the camera installed on the elevator button panel with a center position of both eyes of a test object, and obtaining an image sample data set about the head posture and eyeball posture when the test object's line of sight corresponds to respective buttons in turn.

First, the positions of the human face and eyes are located in the image sample data set to obtain data items {F, $\alpha h$, $\gamma h$, El, Er, $\alpha e$, $\gamma e$} of each image; wherein F is a human face image, $\alpha h$ is a pitch angle of head motion, $\gamma h$ is a yaw angle of head motion, El is a left eye image, Er is a right eye image, $\alpha e$ is a pitch angle of eye movement, and $\gamma e$ is a yaw angle of eye motion.

Next, two sets of data in the image sample data set are randomly selected, wherein a face image F2 and a head posture [$\alpha h1$, $\gamma h1$] are input to the generator Gh, and binocular images El2 and Er2 and an eyeball posture [$\alpha e1$, $\gamma e1$] are input to the generator Ge, so as to obtain a face composite image Fc1 with a composite posture [$\alpha h1$, $\gamma h1$] and binocular composite images Elc1 and Erc1 with a composite posture [$\alpha e1$, $\gamma e1$].

Then, the face composite image Fc1 and the head posture [$\alpha h2$, $\gamma h2$] are input to the generator Gh, and the binocular composite images Elc1 and Erc1 and the eyeball posture [$\alpha e2$, $\gamma e2$] are input to the generator Ge, so as to obtain a reconstructed face image Fr2 and reconstructed binocular images Elr2 and Erc2 meeting preset conditions; the reconstructed face image Fr2 and the reconstructed binocular images Elr2 and Erc2 are compared with the face image F2 and the face image F2 and analyzed to obtain a reconstructed loss data Lrec. The face composite image Fc1 and the binocular composite images Elc1 and Erc1 are input to the generator Gt to obtain a composite image FEc1 compositing a head posture [$\alpha e1$, $\gamma e1$] and an eye posture [$\alpha e1$, $\gamma e1$]; the real face image F1, the real binocular images El1 and Er1 and the composite image FEc1 are respectively input to the preset evaluator for evaluation and analysis to obtain the perception loss data Lp. The face composite image Fc1 and the real face image F1 are input respectively to the first posture discriminator Dh to obtain true and false face information and a regression value [$\alpha h1$, $\gamma h1$] of the head posture; the binocular composite images Elc1, Erc1 and the real binocular images El1, Er1 are input to the third posture discriminator De to obtain true and false binocular information that meets default conditions and a regression value

[αe1, γe1] of the eye posture; the regression loss data Lreg is acquired according to the regression values [αh1, γh1] and [αe1, γe1]. The true and false face information and the true and false binocular information is input in cascaded to the second posture discriminator Dt to obtain true or false information which is analyzed to obtain the loss resistance data Ladv.

Finally, in the adversarial training process, a weighted sum of the loss resistance data Ladv, the reconstruction loss data Lrec, the perception loss data Lp and the regression loss data Lreg is used to adjust the network weight coefficient of the generative adversarial network and obtain the target generative adversarial network.

In the practical implementation, the image sample data set includes at least a first set of data and a second set of data. The first set of data includes: when the test object's head keeps still with eyeballs moving, the image data is obtained which is collected when the line of sight corresponds to respective buttons in turn; the second set of data includes: the test object's line of sight is pointed at the buttons, and the head deflects upward, downward, left and right at two angles in each direction, so as to obtain the image data collected when the line of sight corresponds to respective buttons in turn. For example, the testee eyes are pointed at the numbers from 1 to 30 in the elevator buttons in turn; for the first set of data, when the head is basically not moving and only the eyeballs move, a timer gives a reminder in 2 seconds, and the line of sight will then move to the next button, and data of multiple images will be collected in turn at the same time; and for the second set of data, the line of sight stays on the button, while the head deflects upward, downward, left and right each by two angles (with the pitch angle α and the yaw angle γ), data of multiple images will be acquired in turn, and then the line of sight moves to the next button until the acquisition is completed. It should be noted that the generative adversarial network GazeNet of the line-of-sight direction consists of various generators and discriminators to achieve different functions, the basic architecture of which can be composed of common networks such as a convolutional neural network CNN, a fully connected network FCN, a density network DSN and an input convex neural network ICNN. In the training process, the improved conditional generative adversarial network is used to estimate the line-of-sight direction.

Step 105: According to the head posture and the eyeball posture, calculating a line-of-sight direction and a coordinate of an attention point, detecting whether a dwell time of the line-of-sight is greater than a preset time threshold, and, if so, triggering a button at the coordinate of the attention point.

After the head posture and the eyeball posture are predicted and obtained in Step 104, the line-of-sight direction and the coordinate of the attention point can be further calculated in this step, thereby controlling the corresponding button startup.

In embodiments of the present disclosure, when a human body gets close to the button panel within a predetermined distance, the distance sensors are selected according to the priority order, the selected distance sensors are used to trigger the human face detection, and then the detected face is standardized to locate the eye position. Then, the processed data is input to the posture discriminator Dh and the posture discriminator De respectively, so as to obtain the predicted head posture [αh, γh] and the eyeball posture [αe, γe]. A vector sum is calculated according to the predicted head posture [αh, γh] and the eyeball posture [αe, γe] to obtain α1 and γ1, wherein α1=αh+αe, γ1=γh+γe; the line-of-sight direction and the coordinate of the attention point are calculated according to α1 and γ1 and by a preset algorithm formula, and it is detected whether a dwell time of the line of sight reaches or exceeds a preset time threshold (such as 2 seconds), and, if so, it is determined to trigger a button at the coordinate of the attention point.

In the above process, in a relation between the line-of-sight direction and a three-dimensional coordinate: α=arcsin(−y); γ=arc tan 2(−x, −z). Since this part has already been disclosed in the prior art, it will not be repeated herein.

By adopting the method for non-contact and eye-movement input of the elevator floor disclosed in the present disclosure, intelligent and automatic control of the elevator can be enabled so as to facilitate the operation and avoid manually contacting elevator buttons, thereby effectively preventing infectious virus from spreading through button contact and improving the user experience.

To correspond to the method for non-contact and eye-movement input of elevator floor provided above, the present disclosure also provides an apparatus of non-contact and eye-movement input of elevator floor. Since the embodiment of the apparatus is similar to that of the above-mentioned method, it has a relatively simple description. Please refer to the illustration of the embodiment of the above-mentioned method for similar content. The embodiment described below is only illustrative for the apparatus of the non-contact and eye-movement input of elevator floor. Please refer to FIG. 2 which is a schematic diagram of an apparatus of non-contact and eye-movement input of elevator floor provided in embodiments of the present disclosure.

Figure 2:
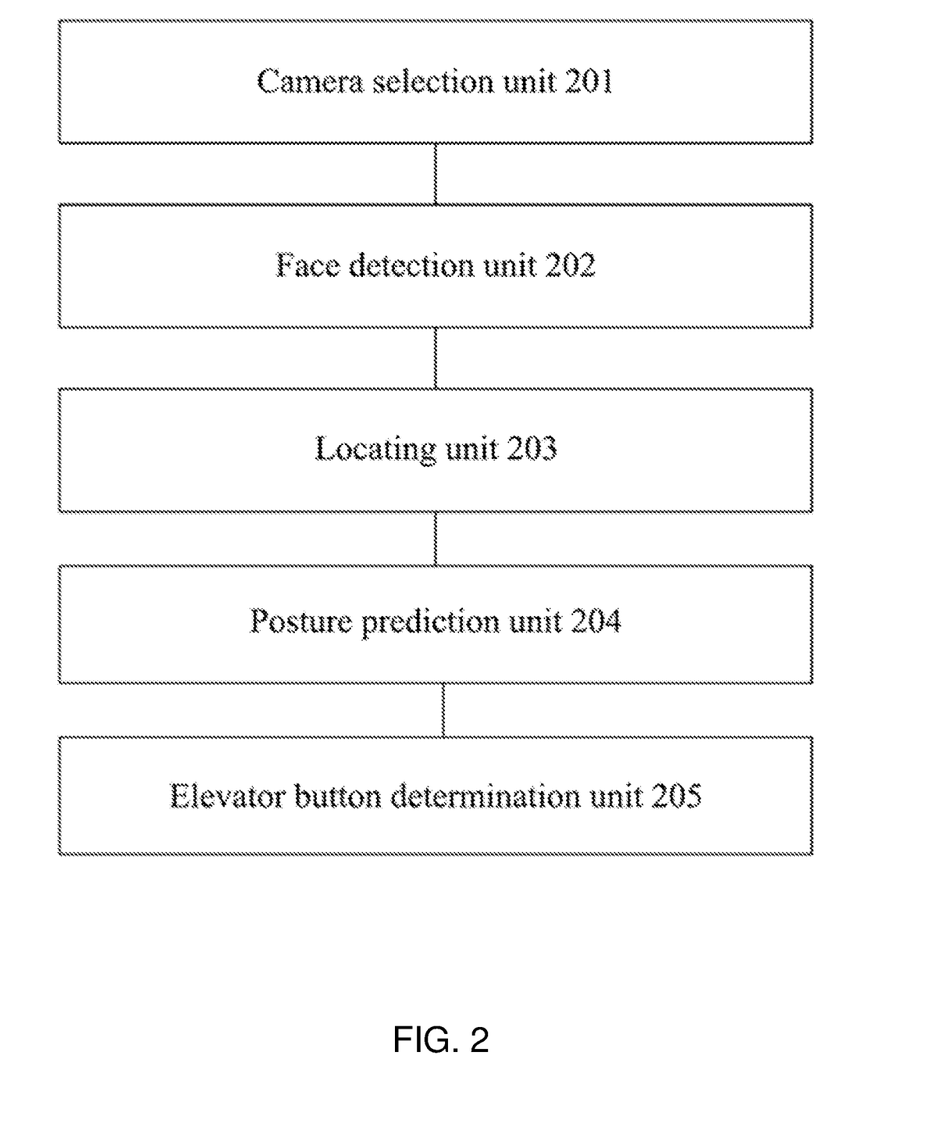
FIG. 2 is a schematic diagram of an apparatus of non-contact and eye-movement input of elevator floor provided in embodiments of the present disclosure.

An apparatus of non-contact and eye-movement input of elevator floor described in the present disclosure includes:

A camera selection unit 201, used for selecting a target camera according to a distance sensor installed on a button panel inside the elevator.

A face detection unit 202, used for triggering a corresponding target camera by using the distance sensor for face detection.

A locating unit 203, used for standardizing a detected human face and locating a binocular position.

A posture predicting unit 204, used for inputting data of a standardized human face image and a binocular image into a preset posture discriminator to obtain a predicted head posture and an eyeball posture.

An elevator button determination unit 205, used for, according to the head posture and the eyeball posture, calculating a line-of-sight direction and a coordinate of an attention point, detecting whether a dwell time of the line-of-sight is greater than a preset time threshold, and, if so, triggering a button at the coordinate of the attention point.

By adopting the apparatus for non-contact and eye-movement input of the elevator floor disclosed in the present disclosure, intelligent and automatic control of the elevator can be enabled so as to facilitate the operation and meet the needs of users for non-contact elevator riding, thereby effectively preventing infectious viruses from spreading through button contact and improving user experience.

Figure 3:
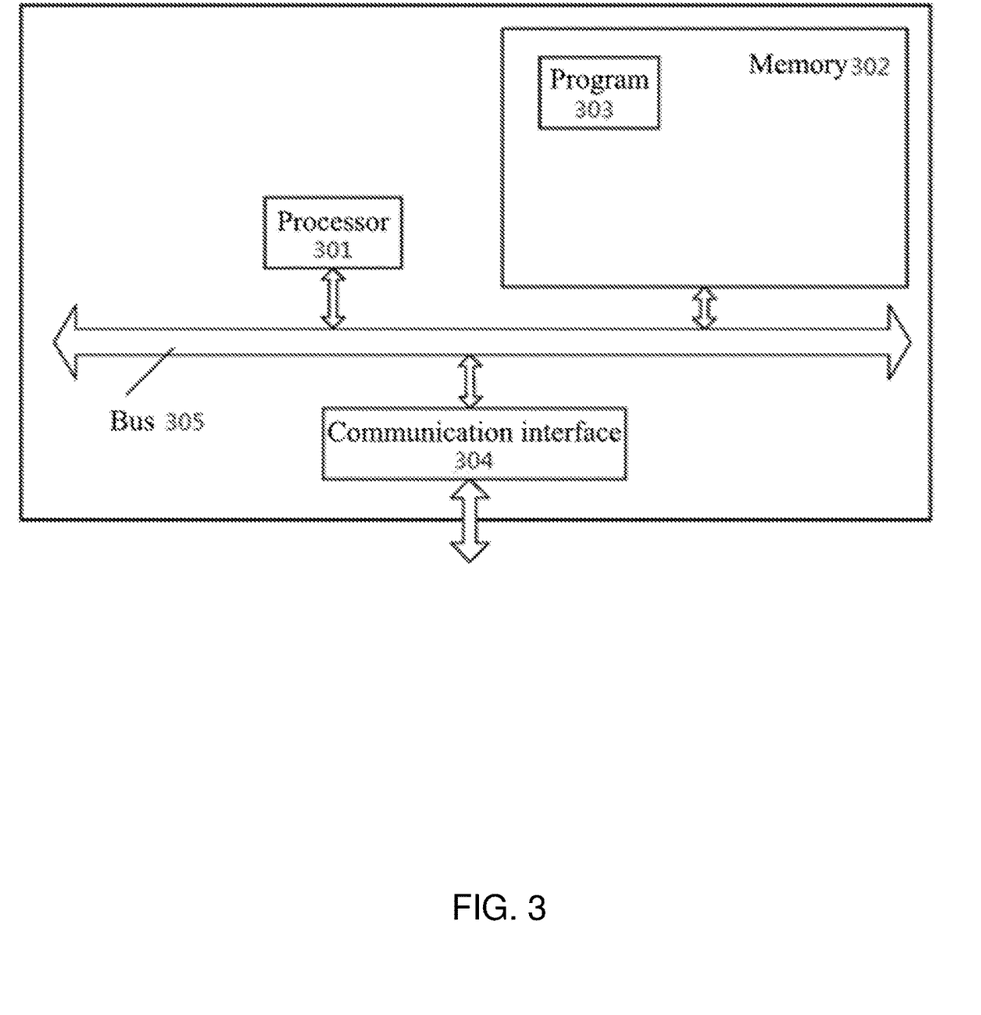
FIG. 3 is a schematic diagram of an electronic device provided in embodiments of the present disclosure.

To correspond to the method for non-contact and eye-movement input of elevator floor provided above, the present disclosure also provides an electrical device. Since the embodiment of the electrical device is similar to that of the above-mentioned method, it has a relatively simple description. Please refer to the illustration of the embodiment of the above-mentioned method for similar content. The electrical device described below is only for illustration. As shown in FIG. 3, FIG. 3 is a schematic diagram of an electronic device provided in embodiments of the present disclosure.

The electronic device includes: a processor 301 and a memory 302, a communication interface 304 and a bus 305. The processor 301 is used for performing tensor calculations and estimating the direction of the line of sight; the memory 302 is used for running one or more program instructions and storing the program of the contactless eye-movement-based elevator floor input method. After the electronic device is powered on and the program of the contactless eye-movement-based elevator floor input method is run through the processor 301, it executes any one of the contactless eye-movement-based elevator floor input methods described above. Program 303 is used for head posture and eyeball posture estimation, calculation of the direction of the line of sight and coordinates of the point of attention, and detection of whether the duration of the line of sight stay is greater than a preset time threshold. The communication interface 304 is used for debugging and downloading program 303, and is used during maintenance and update of the device. The bus 305 is used for the exchange of instructions or data between the processor 301, the memory 302, and the communication interface 304, so as to improve the efficiency of the system.

To correspond to the method for non-contact and eye-movement input of elevator floor provided above, the present disclosure also provides a tangible non-transitory computer storage medium. Since the embodiment of the tangible non-transitory computer storage medium is similar to the above method embodiment, the description is relatively simple. Please refer to the description of the above method embodiment for relevant points. The tangible non-transitory computer storage medium described below is only for illustration.

The tangible non-transitory computer storage medium includes one or more program instructions therein, and the one or more program instructions are used by the processor to perform the method for non-contact and eye-movement input of elevator floor described above.

In embodiments of the present disclosure, the processor or processor module may be an integrated circuit chip capable of signal processing. The processor may be a general-purpose processor, a digital signal processor (DSP), an application specific integrated circuit (ASIC), a field programmable gate array (FPGA) or other programmable logic devices, a discrete gate or transistor logic device, a discrete hardware component, and the like.

The processor may implement or perform various methods, steps and logic block diagrams disclosed in embodiments of the present disclosure. A general-purpose processor may be a microprocessor, or this processor may be any conventional processor or the like. The steps of the method disclosed in combination with the embodiment of the present disclosure can be directly embodied as being completed by a hardware decoding processor, or by the combination of hardware and software modules in the decoding processor. The software module can be located in mature storage media in the art such as a random access memory, a flash memory, a read-only memory, a programmable read-only memory, an electrically erasable programmable read-only memory, a register, and the like. The processor reads information in the storage medium and completes the steps of the above-mentioned method in combination with its hardware.

The storage medium may be a memory, for example, a volatile memory or a non-volatile memory, or may include both volatile and non-volatile memories.

Among the memories, a non-volatile memory may be a Read-Only Memory (ROM), a Programmable ROM (PROM), an Erasable PROM (EPROM), an Electrically EPROM (EEPROM), or a flash memory.

A volatile memory may be a Random Access Memory (RAM) which acts as an external high-speed cache. By illustrative but not restrictive illustration, many forms of RAMs are available, for example, a Static RAM (SRAM), a Dynamic RAM (DRAM), a Synchronous DRAM (SDRAM), a Double Data Rate SDRAM (DDRSDRAM), an Enhanced SDRAM (ESDRAM), a Synch link DRAM (SLDRAM), and a Direct Ram bus RAM (DRRAM).

The storage medium described in the embodiment of the present disclosure is intended to include, but not limited to, these and any other suitable types of memories.

Those skilled in the art should realize that in one or more above-mentioned examples, functions described in the present disclosure can be realized by a combination of hardware and software. When software is applied, its corresponding functions can be stored in a tangible non-transitory computer-readable medium or transmitted as one or more instructions or codes on the tangible non-transitory computer-readable medium. Tangible non-transitory computer-readable media include computer storage media and communication media, wherein the communication media include any medium that facilitates the transmission of computer programs from one place to another. The storage media can be any available media that can be accessed by a general-purpose or special-purpose computer.

The implementations above further illustrate the purposes, technical schemes and beneficial effects of the present disclosure. It is noted that the above description is one implementation of the present disclosure without limiting the scope of the present disclosure. Any modification, equivalent replacement, improvement and the like based on the technical scheme of the present disclosure shall be included in the protection scope of the present disclosure.

What is claimed is:

1. A method for non-contact and eye-movement input of an elevator floor, comprising:

Selecting one of distance sensors on a button panel of an elevator according to a preset priority order when a human body is detected getting close to the button panel of the elevator, and determining a target camera according to a selected distance sensor, wherein at least two combinations of cameras and the distance sensors are installed at different heights on the button panel of the elevator;

Detecting, by the target camera, a human face;

Standardizing, by a computer, a detected human face and determining a binocular position, wherein a standardized image is an image that is acquired by aligning an optical axis of the target camera with a binocular center and then converted into an image sized by 224*224 pixels;

Inputting data of a standardized human face image and a binocular image into preset posture discriminators in the elevator to obtain a predicted head posture $[\alpha h, \gamma h]$ and an eyeball posture $[\alpha e, \gamma e]$; and Calculating a vector sum according to the predicted head posture $[\alpha h, \gamma h]$ and the eyeball posture $[\alpha e, \gamma e]$ to obtain $\alpha 1$ and $\gamma 1$, wherein $\alpha 1 = \alpha h + \alpha e$, $\gamma 1 = \gamma h + \gamma e$; calculating a line-of-sight direction and a coordinate of an attention point according to $\alpha 1$ and $\gamma 1$ and by a preset algorithm formula, and detecting whether a dwell time of a line of sight reaches or exceeds a preset time threshold, and, if so, starting a button on the panel at the coordinate of the attention point; wherein a relation between the line-of-sight direction and a three-dimensional coordinate is $\alpha=\arcsin(-y)$; $\gamma=\arctan 2(-x, -z)$.

2. The method for non-contact and eye-movement input of the elevator floor according to claim 1, the preset posture discriminators are determined by following steps:
   Aligning an optical axis of the target camera with a center position of both eyes of a test object, and obtaining an image sample data set about the head posture and eyeball posture when the test object's line of sight corresponds to respective buttons in turn; wherein the image sample data set includes a first set of data and a second set of data;
   Locating positions of the human face and eyes in the image sample data set to obtain data items; and
   Randomly acquiring corresponding data items from obtained data items to input into the generative adversarial network for adversarial training, and, in the adversarial training process, using a weighted sum of acquired loss resistance data Ladv, reconstruction loss data Lrec, perception loss data Lp and regression loss data Lreg, to adjust a network weight coefficient and obtain the target generative adversarial network;
   wherein, the generative adversarial network consists of a plurality of generators and a plurality of gesture discriminators; and
   Obtaining the preset gesture discriminators from the target generative adversarial network.

3. The method for non-contact and eye-movement input of the elevator floor according to claim 2, wherein the first set of data comprises: when the test object's head keeps still with eyeballs moving, image data is obtained which is collected when the line of sight corresponds to respective buttons in turn; the second set of data includes: the test object's line of sight is pointed at the buttons, and the head deflects upward, downward, left and right at two angles in each direction, so as to obtain the image data collected when the line of sight corresponds to respective buttons in turn.

4. The method for non-contact and eye-movement input of the elevator floor according to claim 2, comprising:
   Locating positions of the human face and eyes in the image sample data set to obtain data items, including: locating the positions of the human face and eyes in the image sample data set to obtain data items $\{F, \alpha h, \gamma h, El, Er, \alpha e, \gamma e\}$ of each image; wherein F is a human face image, $\alpha h$ is a pitch angle of head motion, $\gamma h$ is a yaw angle of head motion, El is a left eye image, Er is a right eye image, $\alpha e$ is a pitch angle of eye movement, and $\gamma e$ is a yaw angle of eye movement;
   Randomly acquiring the corresponding data items from the obtained data items to input into the generative adversarial network for adversarial training, and, in the adversarial training process, using a weighted sum of the acquired loss resistance data Ladv, the reconstruction loss data Lrec, the perception loss data Lp and the regression loss data Lreg to adjust the network weight coefficient and obtain the target generative adversarial network, comprising:
   Randomly selecting two sets of data in the image sample data set, wherein a face image F2 and a head posture $[\alpha h1, \gamma h1]$ are input to a generator Gh, and binocular images El2 and Er2 and an eyeball posture $[\alpha e1, \gamma e1]$ are input to a generator Ge, so as to obtain a face composite image Fc1 with a composite posture $[\alpha h1, \gamma h1]$ and binocular composite images Elc1 and Erc1 with a composite posture $[\alpha e1, \gamma e1]$;
   Inputting the face composite image Fc1 and the head posture $[\alpha h2, \gamma h2]$ to the generator Gh, so as to obtain a reconstructed face image Fr2, and inputting the binocular composite images Elc1 and Erc1 and the eyeball posture $[\alpha e2, \gamma e2]$ to the generator Ge, so as to obtain reconstructed binocular images Elr2 and Erc2 meeting preset conditions; comparing and analyzing the reconstructed face image Fr2 and the reconstructed binocular images Elr2 and Erc2 with the face image F2 to obtain the reconstructed loss data Lrec;
   Inputting the face composite image Fc1 and the binocular composite images Elc1 and Erc1 to a generator Gt to obtain a composite image FEc1 compositing a head posture $[\alpha e1, \gamma e1]$ and an eye posture $[\alpha e1, \gamma e1]$; inputting a real face image F1, real binocular images El1 and Er1 and the composite image FEc1 respectively to a preset evaluator for evaluation and analysis to obtain the perception loss data Lp; wherein the preset posture discriminators comprise: a first posture discriminator Dh, a second posture discriminator Dt and a third posture discriminator De;
   Inputting the face composite image Fc1 and the real face image F1 respectively to the first posture discriminator Dh to obtain true and false face information and a regression value $[\alpha h1, \gamma h1]$ of the head posture; inputting the binocular composite images Elc1, Erc1 and the real binocular images El1, Er1 to the third posture discriminator De to obtain true and false binocular information that meets default conditions and a regression value $[\alpha e1, \gamma e1]$ of eye postures; acquiring the regression loss data Lreg according to the regression values $[\alpha h1, \gamma h1]$ and $[\alpha e1, \gamma e1]$;
   Inputting the true and false face information and the true and false binocular information in a cascaded form to the second posture discriminator Dt to obtain true or false information which is analyzed to obtain the loss resistance data Ladv; and
   In the adversarial training process, using a weighted sum of the loss resistance data Ladv, the reconstruction loss data Lrec, the perception loss data Lp and the regression loss data Lreg to adjust the network weight coefficient of the generative adversarial network and obtain the target generative adversarial network.

5. The method for non-contact and eye-movement input of the elevator floor according to claim 1, wherein the distance sensor comprises at least one of: an optical distance sensor, an infrared distance sensor and an ultrasonic distance sensor.

6. An electronic device, comprising:
   A processor; and
   A memory, used for storing a program of the method for non-contact and eye-movement input of elevator floor; after the electronic device is powered on and the processor runs the program of the method for non-contact and eye-movement input of elevator floor, the electronic device is configured to perform a method for non-contact and eye-movement input of elevator floor, the method comprising:
   Selecting one of distance sensors on a button panel of an elevator according to a preset priority order when a human body is detected getting close to the button panel of the elevator, and determining a target camera according to a selected distance sensor, wherein at least two combinations of cameras and the distance sensors are installed at different heights on the button panel of the elevator;
   Detecting, by the target camera, a human face;
   Standardizing, by a computer, a detected human face and determining a binocular position, wherein a standardized image is an image that is acquired by aligning an optical axis of the target camera with a binocular center and then converted into an image sized by 224*224 pixels;

Inputting data of a standardized human face image and a binocular image into preset posture discriminators in the elevator to obtain a predicted head posture [$\alpha h$, $\gamma h$] and an eyeball posture [$\alpha e$, $\gamma e$]; and Calculating a vector sum according to the predicted head posture [$\alpha h$, $\gamma h$] and the eyeball posture [$\alpha e$, $\gamma e$] to obtain $\alpha 1$ and $\gamma 1$, wherein $\alpha 1 = \alpha h + \alpha e$, $\gamma 1 = \gamma h + \gamma e$; calculating a line-of-sight direction and a coordinate of an attention point according to $\alpha 1$ and $\gamma 1$ and by a preset algorithm formula, and detecting whether a dwell time of a line of sight reaches or exceeds a preset time threshold, and, if so, starting a button on the panel at the coordinate of the attention point; wherein a relation between the line-of-sight direction and a three-dimensional coordinate is $\alpha = \arcsin(-y)$; $\gamma = \arctan 2(-x, -z)$.

7. The electronic device according to claim 6, the preset posture discriminators are determined by following steps:

Aligning an optical axis of the target camera with a center position of both eyes of a test object, and obtaining an image sample data set about the head posture and eyeball posture when the test object's line of sight corresponds to respective buttons in turn; wherein the image sample data set includes a first set of data and a second set of data;

Locating positions of the human face and eyes in the image sample data set to obtain data items; and Randomly acquiring corresponding data items from obtained data items to input into the generative adversarial network for adversarial training, and, in the adversarial training process, using a weighted sum of acquired loss resistance data Ladv, reconstruction loss data Lrec, perception loss data Lp and regression loss data Lreg, to adjust a network weight coefficient and obtain the target generative adversarial network;

wherein, the generative adversarial network consists of a plurality of generators and a plurality of gesture discriminators; and Obtaining the preset gesture discriminators from the target generative adversarial network.

8. The electronic device according to claim 7, wherein the first set of data comprises: when the test object's head keeps still with eyeballs moving, image data is obtained which is collected when the line of sight corresponds to respective buttons in turn; the second set of data includes: the test object's line of sight is pointed at the buttons, and the head deflects upward, downward, left and right at two angles in each direction, so as to obtain the image data collected when the line of sight corresponds to respective buttons in turn.

9. The electronic device according to claim 7, comprising:

Locating positions of the human face and eyes in the image sample data set to obtain data items, including: locating the positions of the human face and eyes in the image sample data set to obtain data items {F, $\alpha h$, $\gamma h$, El, Er, $\alpha e$, $\gamma e$} of each image; wherein F is a human face image, $\alpha h$ is a pitch angle of head motion, $\gamma h$ is a yaw angle of head motion, El is a left eye image, Er is a right eye image, $\alpha e$ is a pitch angle of eye movement, and $\gamma e$ is a yaw angle of eye movement;

Randomly acquiring the corresponding data items from the obtained data items to input into the generative adversarial network for adversarial training, and, in the adversarial training process, using a weighted sum of the acquired loss resistance data Ladv, the reconstruction loss data Lrec, the perception loss data Lp and the regression loss data Lreg to adjust the network weight coefficient and obtain the target generative adversarial network, comprising:

Randomly selecting two sets of data in the image sample data set, wherein a face image F2 and a head posture [$\alpha h1$, $\gamma h1$] are input to a generator Gh, and binocular images El2 and Er2 and an eyeball posture [$\alpha e1$, $\gamma e1$] are input to a generator Ge, so as to obtain a face composite image Fc1 with a composite posture [$\alpha h1$, $\gamma h1$] and binocular composite images Elc1 and Erc1 with a composite posture [$\alpha e1$, $\gamma e1$];

Inputting the face composite image Fc1 and the head posture [$\alpha h2$, $\gamma h2$] to the generator Gh, so as to obtain a reconstructed face image Fr2, and inputting the binocular composite images Elc1 and Erc1 and the eyeball posture [$\alpha e2$, $\gamma e2$] to the generator Ge, so as to obtain a reconstructed binocular images Elr2 and Erc2 meeting preset conditions; comparing and analyzing the reconstructed face image Fr2 and the reconstructed binocular images Elr2 and Erc2 with the face image F2 to obtain the reconstructed loss data Lrec;

Inputting the face composite image Fc1 and the binocular composite images Elc1 and Erc1 to a generator Gt to obtain a composite image FEc1 compositing a head posture [$\alpha e1$, $\gamma e1$] and an eye posture [$\alpha e1$, $\gamma e1$]; inputting a real face image F1, real binocular images El1 and Er1 and the composite image FEc1 respectively to a preset evaluator for evaluation and analysis to obtain the perception loss data Lp; wherein the preset posture discriminators comprise: a first posture discriminator Dh, a second posture discriminator Dt and a third posture discriminator De;

Inputting the face composite image Fc1 and the real face image F1 respectively to the first posture discriminator Dh to obtain true and false face information and a regression value [$\alpha h1$, $\gamma h1$] of the head posture; inputting the binocular composite images Elc1, Erc1 and the real binocular images El1, Er1 to the third posture discriminator De to obtain true and false binocular information that meets default conditions and a regression value [$\alpha e1$, $\gamma e1$] of eye postures; acquiring the regression loss data Lreg according to the regression values [$\alpha h1$, $\gamma h1$] and [$\alpha e1$, $\gamma e1$];

Inputting the true and false face information and the true and false binocular information in a cascaded form to the second posture discriminator Dt to obtain true or false information which is analyzed to obtain the loss resistance data Ladv; and In the adversarial training process, using a weighted sum of the loss resistance data Ladv, the reconstruction loss data Lrec, the perception loss data Lp and the regression loss data Lreg to adjust the network weight coefficient of the generative adversarial network and obtain the target generative adversarial network.

10. The electronic device according to claim 6, wherein the distance sensor comprises at least one of: an optical distance sensor, an infrared distance sensor and an ultrasonic distance sensor.

* * * * *